Nov. 25, 1941.   T. C. VAN DEGRIFT   2,263,789
PROTECTIVE DEVICE FOR JOURNALS
Filed Sept. 11, 1940

Inventor
Thomas C. Van Degrift
By Blackmore, Spencer & Flint
Attorneys

Patented Nov. 25, 1941

2,263,789

UNITED STATES PATENT OFFICE 2,263,789

PROTECTIVE DEVICE FOR JOURNALS

Thomas C. Van Degrift, Detroit, Mich., assignor to General Motors Corporation, Detroit, Mich., a corporation of Delaware Application September 11, 1940, Serial No. 356,347

6 Claims. (Cl. 308—238)

This invention relates to a means of preserving the surface finish of the highly polished journals of shafts which are essentially supported on such journals, for further processing of the shaft, after the journals have been finished.

More specifically it relates to a means of preserving the highly polished surface finish of the journals of a crankshaft, while it is being revolved in the cradle of a balancing machine.

The supporting bearings of such machines are commonly plain bearings of hard material such as tungsten carbide, to reduce wear. In such cases the bearings themselves may produce scratches on the highly polished journals of the crankshaft, or dirt particles which cannot imbed themselves in the bearings will scratch the journals. On the other hand, if the journals are supported on rollers in which dirt particles may imbed themselves, the rollers will be quickly worn and will require frequent replacement.

The object of the invention is to provide plain bearings, in which the journals of shafts are successively supported and run for a short period of time, with a thin renewable surface of suitable relatively soft material in which dirt particles may imbed themselves, interposed between the journal and its bearing.

The above and other objects of the invention will be apparent as the description proceeds.

According to the invention, paper or cloth has been found a suitable material for the renewable bearing surface, and a supply in the form of a roll or rolls of width equal to the width of the bearing, and of the requisite thickness which is allowed for in the bearings, is mounted on the machine opposite each of the bearings.

Before placing each shaft in the machine, a sufficient new length to extend the required distance around the bearing is unwound as a lining for the bearing, and the length previously used is torn or cut off, thus providing a clean scratch-free bearing that is always of the proper size.

The drawing shows the application of the invention to a crankshaft balancing machine.

Figure 1:
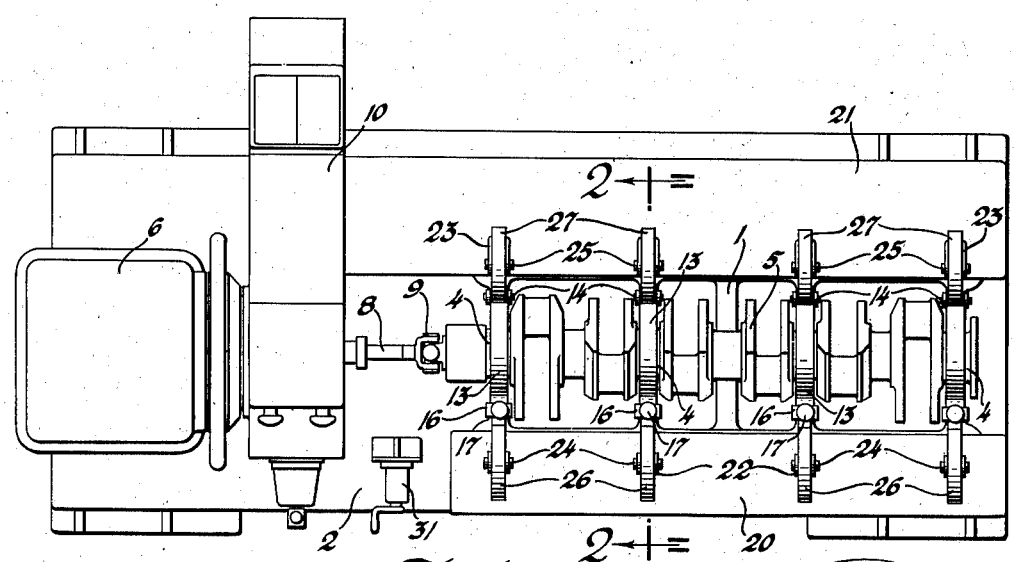
Fig. 1 is a plan view of the machine.
Figure 2:
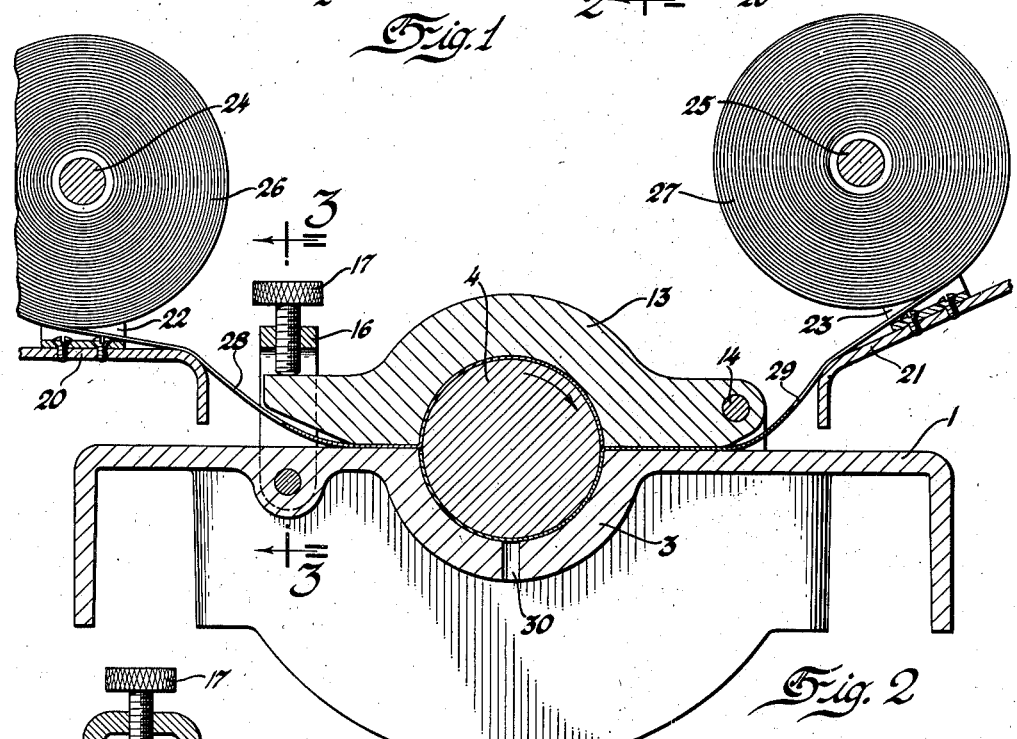
Fig. 2 is an enlarged sectional view on line 2—2 of Fig. 1.
Figure 3:
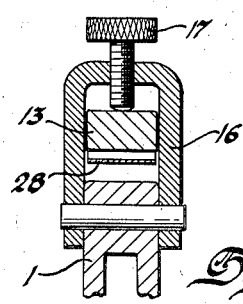
Fig. 3 is a view on line 3—3 of Fig. 2.

The cradle 1 of the machine is resiliently mounted on the base plate 2, and is provided with bearings such as 3, for journals such as 4, of a crankshaft such as 5 to be balanced. The crankshaft is placed in the cradle and revolved in the bearings 3, by an electric motor 6, through a shaft 8, with a universal joint connection 9 to the crankshaft 5.

The resilient mounting of the cradle permits floating oscillation thereof due to any dynamic unbalance of the crankshaft to be balanced, and any such oscillations are transmitted in known manner to the indicator shown generally at 10, through suitable connections. Neither the resilient mounting nor the connections from the cradle to the indicator are shown, because they form no part of the present invention.

There is a quickly releasable cap such as 13 for each bearing such as 3. The caps are hinged at one end to the cradle by hingepins 14, while their opposite ends are clamped to the cradle by hinged bridge pieces 16 provided with tightening screws 17.

In the example illustrated, the crankshaft is a six throw crankshaft with seven main journals, but it is sufficiently supported in the cradle of the machine on four bearings such as 3, one for each alternate main journal 4.

On opposite sides of the machine above the cradle 1 are brackets 20 and 21 respectively. Mounted on the brackets 20 and 21 opposite each of the bearings such as 3 are small brackets such as 22 and 23, with spindles 24 and 25, for rolls 26 and 27 respectively, of cloth or other suitable relatively soft material, to constitute the renewable bearing surfaces.

Cloth from the rolls 27 extends over the bearing surfaces of the bearings 3 for 180° around the journals 4 in the direction of rotation of the shaft 5, while cloth from the rolls 26 extends over the bearing surfaces of the caps 13 for the remaining 180° around the journals 4 in the direction of rotation of the shaft 5.

Before each successive crankshaft 5 is placed in the machine, the used portion of the cloth forming the renewable bearing surface material is cut off, and fresh lengths of cloth such as 29 are unwound from the rolls 27, to cover the bearing surfaces of the bearings 3, before the crankshaft is placed therein. After the crankshaft has been placed in the bearings 3, similar fresh lengths of cloth such as 28 are unwound from the rolls 26, to cover the bearing surfaces of the caps 13, and the caps and the renewable bearing surfaces are clamped in position by the bridge pieces 16 with their tightening screws 17.

If desired, either the rolls 26 or the rolls 27 could be dispensed with, and cloth from the remaining rolls could extend for 360° around the bearings in the direction of rotation of the shaft, instead of through 180° from each of two rolls as illustrated.

The renewable bearing surfaces are lubricated in any suitable way. As illustrated, a duct such as 30 is provided through each bearing 3, and a shot of oil for each crankshaft that is placed in the machine is conducted thereto from a hand pump 31, through pipes (not shown).

I claim:

1. In a machine for processing shafts having highly polished journals, and having a bearing in which the journals of the shafts are successively supported and run for a short period of time, a renewable bearing surface for said bearing, consisting of a thin piece of suitable material in which dirt particles may imbed themselves, interposed between the journal and its bearing, and which may be changed for a new piece of the said material, to provide a bearing with a fresh clean surface for each shaft that is placed in the machine, said material being clamped to the machine opposite said bearing and extending therefrom over the bearing surface of the bearing, in the direction of rotation of the shaft.

2. The combination according to claim 1, in which the material of the renewable surface is cloth.

3. The combination according to claim 1, in which the material of the renewable bearing surface is in roll form, of width equal to the width of the bearing and of the requisite thickness, mounted on the machine opposite each of the bearings.

4. The combination according to claim 1, in which the machine is a crankshaft balancing machine.

5. The combination according to claim 1, in which the material of the renewable bearing surface is in roll form, there being rolls on opposite sides of the machine from one of which the material is unwound to extend over the bearing surface of the bearing, through 180° around the journal of the shaft, in the direction of rotation thereof, and from the other of which the material is unwound to extend over the bearing surface of a cap for the bearing, through the remaining 180° around the journal of the shaft, in the direction of rotation thereof.

6. The combination according to claim 1, in which the bearing has a quickly releasable cap which is hinged and clamped in position by means bridging the material of the renewable bearing surface, said material being clamped in the joint between the cap and the bearing.

THOMAS C. VAN DEGRIFT.